UNITED STATES PATENT OFFICE.

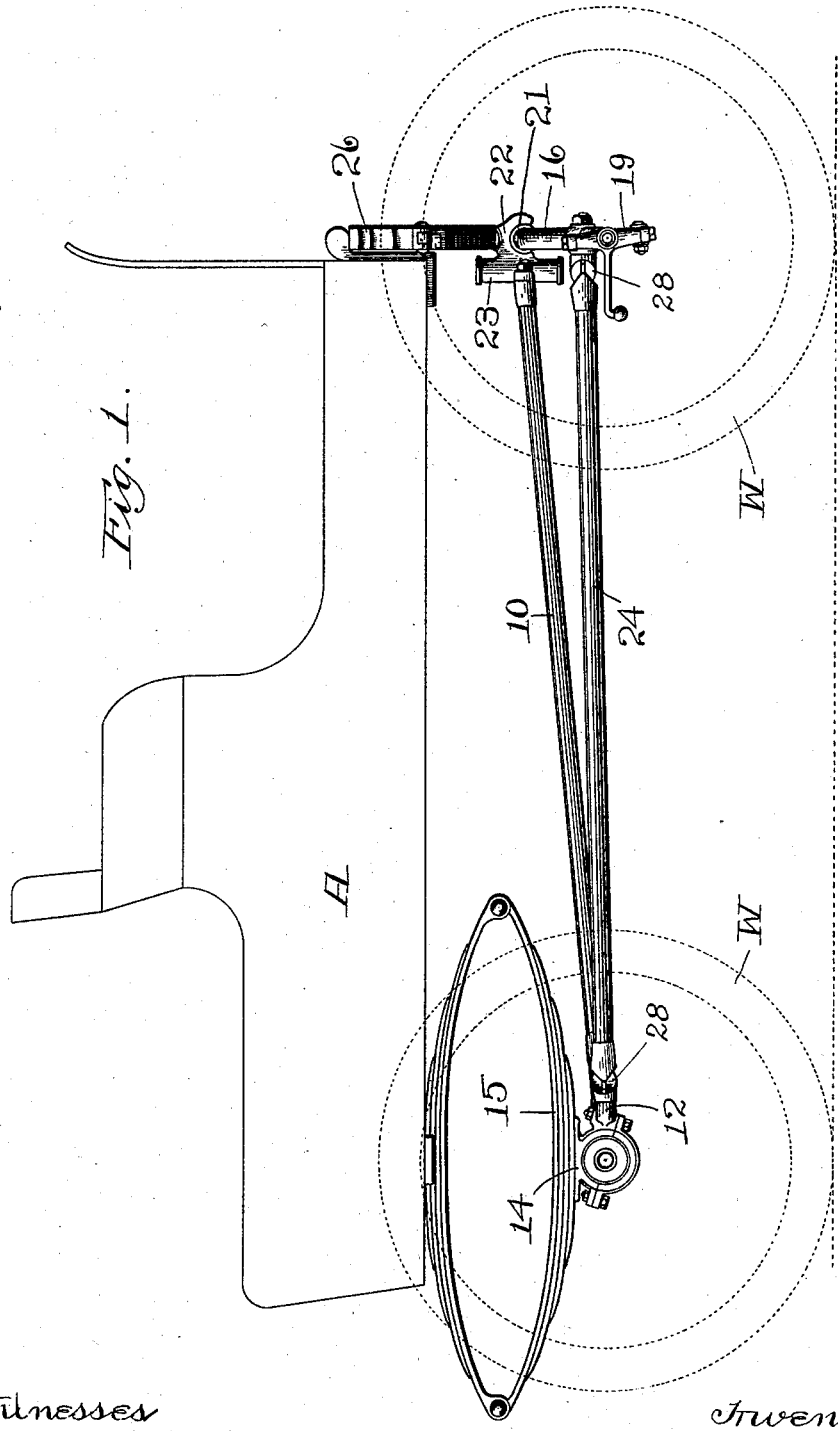

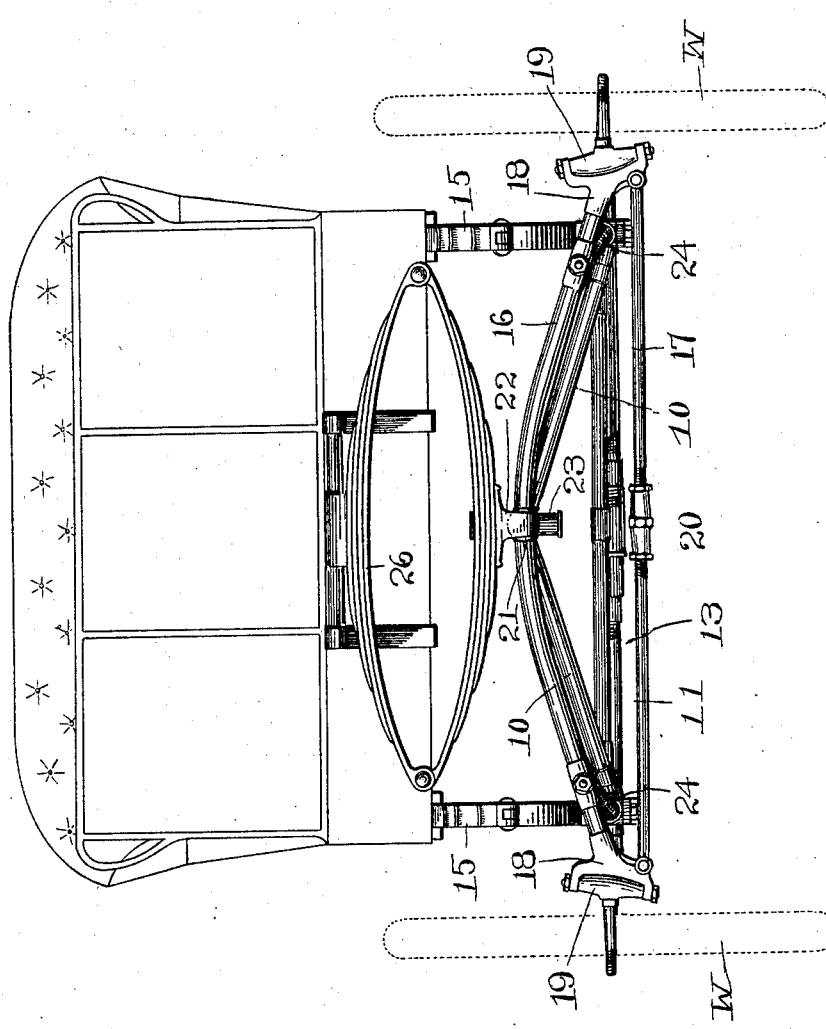

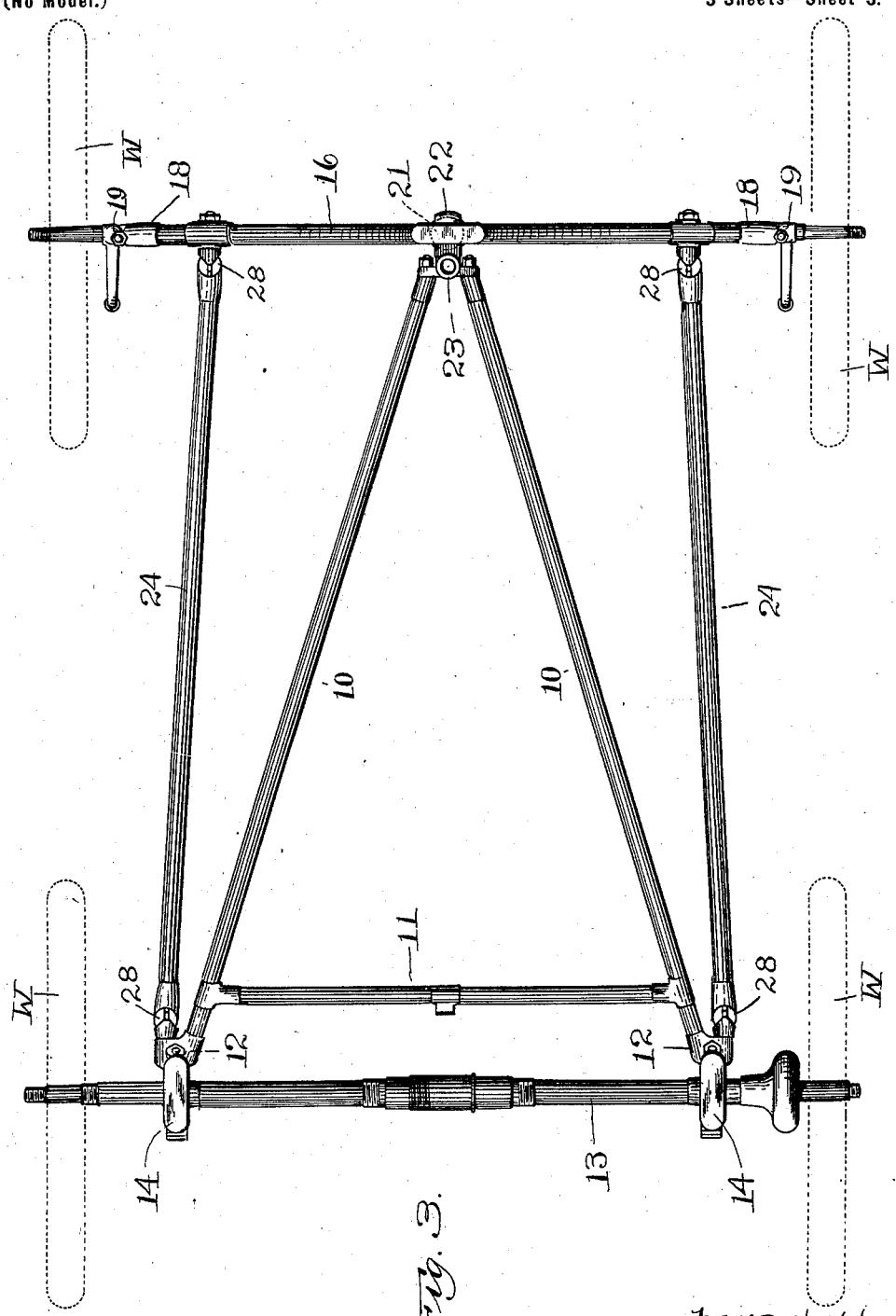

RALPH L. MORGAN AND WILLIAM H. EDMONDSON, OF WORCESTER, MASSACHUSETTS, ASSIGNORS, BY MESNE ASSIGNMENTS, TO AMERICAN BICYCLE COMPANY, OF JERSEY CITY, NEW JERSEY, AND NEW YORK, N. Y., A CORPORATION OF NEW JERSEY.

RUNNING-GEAR FOR MOTOR-CARRIAGES.

SPECIFICATION forming part of Letters Patent No. 686,235, dated November 5, 1901.

Application filed August 24, 1900. Serial No. 27,889. (No model.)

*To all whom it may concern:*

Be it known that we, RALPH L. MORGAN and WILLIAM H. EDMONDSON, citizens of the United States, residing at Worcester, in the county of Worcester and State of Massachusetts, have invented a new and useful Running-Gear for Motor-Carriages, of which the following is a specification.

The invention relates to the running-gear and the combination of parts therein as hereinafter described, and more particularly pointed out in the claims at the end of this specification.

In the accompanying three sheets of drawings, Figure 1 is a side view illustrating a motor-vehicle provided with a running-gear constructed according to this invention. Fig. 2 is a front view thereof, and Fig. 3 is a plan view of the running-gear with the springs and vehicle-body removed.

One especial object of our present invention is to dispense with a sliding joint between the A-frame and front axle, and to accomplish this purpose instead of employing a straight single-piece front axle we preferably employ an axle having the form of a bow or other truss, and we provide a universal joint or connection between the A-frame and the central part of the front axle which is not in line with the points of connection between the front axle and side bars— that is to say, instead of employing a slip-joint to allow for the take-up of the side bars of the running-gear a running-gear constructed according to our present invention employs a universal joint at the center of the front axle, which is out of line with and preferably above the level of the points of connection of the front axle and side bars, so that as the front axle is tipped or tilted with respect to the rear axle it will swing or turn on the universal joint at the apex of the A-frame, while at the same time the side bars will act to keep the ends of the front axle at all times in a vertical plane parallel with the rear axle.

Referring to the drawings and in detail, a running-gear constructed according to our invention as herein illustrated comprises an A-frame, which consists of side bars 10 and a cross-bar 11. At the end of each side leg 10 of the A-frame are the hangers 12, and journaled in the hangers 12 is the rear axle 13, which may be formed in two sections connected by the compensating-gear in the ordinary manner. The hangers 12 are each provided with a supporting-plate 14 for carrying one of the rear springs 15, which support the rear end of the body A, as shown in Fig. 1.

Instead of employing a straight-line front axle we preferably employ a front axle having the form of a bow or other truss.

As shown most clearly in Fig. 2, the front axle consists of a curved piece 16, secured at the ends of which are brackets 18, which brackets 18 are connected by a tie-rod 17, having a turnbuckle 20 for adjusting the same. Pivoted in the brackets 18 are pieces 19, which carry the axles on which the front wheels W are journaled.

Secured at the center and preferably at the highest point of the front axle is a ball 21, which fits into a socket-piece 22, which forms the apex of the A-frame.

As shown most clearly in Fig. 1, the socket-piece 22 may be provided with a vertical box or bearing 23 for steering-shaft of the machine. The socket-piece 22 is also provided with a plate carrying the front spring 26, which supports the front end of the vehicle-body.

Connecting the hangers 12 and the front axle are the side bars 24, having universal joints 28 therein. The points of connection between the side bars 24 and the front axle are out of line with or below the universal joint which connects the middle part of the front axle with the apex of the A-frame. By means of this construction whenever the axles are tipped or tilted at an angle with respect to each other the front axle will both pivot and swing about the apex of the A-frame as a center, while at the same time the side bars will always hold the front and rear axles in parallel vertical planes—that is to say, in a running-gear constructed according to our invention we have provided a construction which may respond to strains in all directions with perfect flexibility by means of universal joints alone.

We are aware that numerous changes may be made in constructing and applying our running-gear by those who are skilled in the art, and we do not wish, therefore, to be limited to the construction which we have herein shown and described; but What we do claim, and desire to secure by Letters Patent of the United States, is—

1. In a vehicle, the combination of a rear axle, a front axle, pivoted side bars extending from the front to the rear axles, and a frame having a universal connection to the center of the front axle, which is out of line with the ends of the front axle, substantially as described.

2. In a vehicle, the combination of an A-shaped frame, a rear axle journaled in hangers at the ends of the side legs of the A-frame, a front axle having a universal connection with the apex of the A-frame, and pivoted side bars connecting the rear axle with points of the front axle which are out of line with the universal joint at the center thereof, substantially as described.

3. In a vehicle, the combination of an A-frame occupying a slightly inclined or tilted position, a rear axle journaled in hangers at the ends of the side legs of the A-frame, a front axle having the form of a truss, with a universal-joint connection at its center, with the apex of the A-frame, and movable pieces on which the front wheels are journaled, which are pivoted in brackets at the ends of the front axle, substantially as described.

4. In a vehicle, the combination of an A-frame, comprising an apex-piece, side legs extending therefrom, a cross-piece connecting said side legs, a rear axle journaled in hangers at the ends of the side legs of the A-frame, a bow or truss shaped front axle having a central universal connection with the apex of the A-frame, and side bars connecting the rear axle to points on the front axle which are below its central universal connection with the A-frame, each of said side bars having a universal joint near each end thereof, substantially as described.

5. In a vehicle, the combination of an inclined A-frame comprising an apex-piece 22, side legs 10 extending back from the apex-piece, a cross-bar 11 connecting said side legs, hangers 12 at the ends of the side legs 10, springs 15 mounted on the hangers 12 for supporting the rear end of the vehicle-body, a rear axle journaled in the hangers 12, a front axle comprising a curved section 16, having its ends connected by a rod 17, and having a universal connection at its center with the apex of the A-frame, a transverse spring 26, carried by the apex-piece of the A-frame for supporting the front end of the vehicle-body, and pieces pivoted in brackets at the ends of the front axle on which the front wheels are journaled, substantially as described.

In testimony whereof we have hereunto set our hands in the presence of two subscribing witnesses.

RALPH L. MORGAN.
WILLIAM H. EDMONDSON.

Witnesses:
 FREDERIC BULKELEY HYDE,
 HENRY STUMM.